United States Patent [19]

Koevenig et al.

[11] Patent Number: 5,262,464
[45] Date of Patent: Nov. 16, 1993

[54] WATERBORNE PRIMER FOR CORROSION PROTECTION OF AIR DRY, WATERBORNE METALLIC COATINGS

[75] Inventors: Brian P. Koevenig, Lambertville, Mich.; Richard A. Cowles, Perrysburg, Ohio; Horst J. Finkenauer, Sopan Baug, India

[73] Assignee: BASF Corporation, Parsippany, N.J.

[21] Appl. No.: 805,257

[22] Filed: Dec. 9, 1991

[51] Int. Cl.⁵ .................. C08F 20/66; C08L 51/00; C09B 5/08
[52] U.S. Cl. .................. 524/413; 524/414; 524/417; 524/443; 524/507
[58] Field of Search ............ 524/413, 414, 443, 507, 524/417

[56] References Cited

U.S. PATENT DOCUMENTS

| | | | |
|---|---|---|---|
| 3,248,354 | 4/1966 | Birten | 524/443 |
| 3,814,717 | 6/1974 | Wilson et al. | 524/443 |
| 3,986,998 | 10/1976 | Schmitt et al. | 524/443 |
| 4,016,124 | 4/1977 | Crisp et al. | 524/443 |
| 4,067,837 | 1/1978 | Miller | 524/443 |
| 4,271,057 | 6/1981 | Drake et al. | 524/443 |
| 4,448,922 | 5/1984 | McCartney | 524/443 |
| 4,885,324 | 12/1989 | Hegedus et al. | 524/414 |
| 4,954,559 | 9/1990 | Hartog et al. | 524/507 |

Primary Examiner—Paul R. Michl
Assistant Examiner—Olga Asinovsky

[57] ABSTRACT

An aqueous coating composition, comprising
A) an aqueous anionic polyacrylate or polyurethane dispersion obtainable by dispersing
1) a polyacrylate resin, having functional groups selected from the group consisting of carboxylic acid groups, carboxylic anhydride groups or mixtures thereof in water in the presence of ammonia, or,
2) a fully reacted polyurethane resin, formed from the reaction of a glycol or polyol of polyester or polyether with a diisocyanate, and then neutralized with ammonia or other amine, and dispersed in water
B) a phosphorous containing pigment
C) additives selected from the group consisting of pigments, solvents, rust inhibitors, dispersants, surfactants or mixtures thereof.

The coating composition is useful as a primer for metal substrates in combination with a waterborne basecoat to give a stable metallic effect.

14 Claims, No Drawings

WATERBORNE PRIMER FOR CORROSION PROTECTION OF AIR DRY, WATERBORNE METALLIC COATINGS

FIELD OF THE INVENTION

The present invention is directed to an aqueous coating composition for the coating of metallic substrates such as automotive vehicles, more specifically it is directed to a waterborne primer whose primary purpose is to prevent the galvanic degradation of overlaying waterborne coatings containing metallic pigments.

BACKGROUND OF THE INVENTION

Multi-layer systems have been utilized to coat automobiles for a number of years, but the early development of these systems necessarily employed organic solvents. As environmental regulations became more stringent organic-borne systems became less desirable. The recent research emphasis in the area of multi-layer systems, especially basecoat systems, has focused on the development of water-borne systems for multi-layer coatings.

In particular, as organic-borne systems were formulated to require less and less organic solvent, becoming known in the industry as "high solids" coatings, it became obvious that the appearance, in particular the metallic effect of coatings containing metallic pigments, suffered with the increase in solids. One of the opportunities which water-borne systems presents is that of improving on the metallic effect in a coating which complies with the restrictions on volatile organic content. For example, the U.S. Pat. Nos. 4,880,867 and 4,954,559 discloses an aqueous coating composition comprising a mixture of an acrylic dispersion and a polyurethane dispersion, which can be used as a primer or a basecoat. Water-borne systems, however, resulted in other problems.

When waterborne coatings, which contain aluminum pigments are applied over steel substrates, scribed through the coating to bare steel, and exposed to a sodium chloride salt spray (ASTM B-117), the metallic effect disappears, leaving either the solid color of the coating or of the primer, if the coating contains no other pigments than the aluminum. This phenomenon is the result of the sodium chloride solution functioning as an electrolyte in the presence of the two dissimilar metals, e.g., the aluminum pigment and the steel substrate. The phenomenon is described is termed galvanic action.

The object of the present invention was to provide an aqueous coating composition as a waterborne primer for metallic substrates which does not show the above mentioned disappearance of the metallic effect. Another object was to provide an aqueous primer with a low volatile organic content, a method of coating a substrate with said primer and a substrate coated with at least said primer.

SUMMARY OF THE INVENTION

The objects of the present invention are achieved with an aqueous coating composition, comprising
A) an aqueous polyacrylate or polyurethane dispersion obtainable by dispersing
  1) a polyacrylate resin, having functional groups selected from the group consisting of carboxylic acid groups, carboxylic anhydride groups or mixtures thereof in water in the presence of ammonia or;
  2) a fully reacted polyurethane resin, formed from the reaction of a glycol or polyol of polyester or polyether with a diisocyanate, and then neutralized with ammonia or other amine, and dispersed in water;
B) a phosphate or phosphosilicate containing pigment;
C) additives selected from the group consisting of solvents, pigments, rust inhibitors, dispersants, surfactants or mixtures thereof.

DETAILED DESCRIPTION OF THE INVENTION

Suitable polyacrylate resins according to the invention comprise:
i) about 1 to about 30% by weight of an ethylenically unsaturated carboxylic acid or anhydride or mixtures thereof
ii) about 20 to about 90% other ethylenically unsaturated monomers
iii) about 0 to 50% by weight of an ethylenically unsaturated monomer with a functional group other than the carboxylic acid group or the carboxylic anhydride group.

Preferred polyacrylate resins comprise:
i) about 1 to about 20% by weight of an ethylenically unsaturated carboxylic acid or anhydride or mixtures thereof
ii) about 40 to about 85% other ethylenically unsaturated monomers
iii) about 2 to 40% by weight of an ethylenically unsaturated monomer with a functional group other than the carboxylic acid group or the carboxylic anhydride group.

Most preferred polyacrylate resins comprise:
i) about 3 to about 15% by weight of an ethylenically unsaturated carboxylic acid or anhydride or mixtures thereof
ii) about 55 to about 85% other ethylenically unsaturated monomers
iii) about 5 to 30% by weight of an ethylenically unsaturated monomer with a functional group other than the carboxylic acid group or the carboxylic anhydride group.

Suitable ethylenically unsaturated carboxylic acid monomers (i) are acrylic acid, methacrylic acid, acryloxypropionic acid or polyacrylic acid mixtures, methacrylic acid dimer or polymethacrylic acid mixtures, crotonic acid, fumaric acid, maleic acid or maleic anhydride, itaconic acid or itaconic anhydride, and monoalkylesters of maleic, itaconic or fumaric acids.

The other ethylenically unsaturated monomers (ii) may be chosen from acrylic or methacrylic alkyl ester derived from alcohols having 1 to about 20 carbon atoms, or vinyl monomers. The expression (meth)acrylate with parenthesis as used herein includes methacrylate and acrylate. Suitable examples are methyl (meth)acrylate, ethyl (meth)acrylate, propyl (meth)acrylate, n-butyl (meth)acrylate, isobutyl (meth)acrylate, t-butyl (meth)acrylate and 2-ethylhexyl (meth)acrylate, maleic acid or fumaric acid dialkylesters in which the alkyl groups have 1 to 20 carbon atoms, vinylaromatics such as styrene, α-methylstyrene, vinyltoluene, t-butylstyrene, halogenated vinylbenzenes such as chlorostyrene, and other monomers like vinylchloride, (meth)-acrylamide and (meth)acrylonitrile.

Examples of ethylenically unsaturated monomers with a functional group other than the carboxylic acid group or the carboxylic anhydride group (iii) are hydroxyethyl (meth)acrylate, hydroxypropyl (meth)acrylate, isocyanatoethyl methacrylate, hydroxybutyl (meth)acrylate, propylene glycol monoacrylate, 2,3-dihydroxypropyl methacrylate, pentaerythritol monomethacrylate, polypropyleneglycol monoacrylates, and m-isopropenyl-α,α-dimethylbenzyl isocyanate.

Other examples of (iii) are maleic acid and fumaric acid dihydroxyalkyl esters in which the straight chained, branched or cyclic alkylgroup contains 2 to 20 carbon atoms. N-hydroxyalkyl(meth)acrylamides and N-hydroxyalkylfumaric acid mono- or di-amides may also be used, e.g., N-hydroxyethylacrylamide or N-(2-hydroxypropyl)-methacrylamide. Other hydroxyl group containing compounds include allylalcohol, monovinylethers of polyols, especially diols, such as monovinylethers of ethylene glycol and butanediol, and hydroxyl group containing allyl ethers or esters such as 2,3-dihydroxypropylmonoallylether, trimethylolpropane monoallylether or 2,3-dihydroxypropanoic acid allylester.

Copolymerization is carried out using conventional techniques such as heating the monomers in the presence of a polymerization initiating gent and optionally chain transfer agents. The copolymerization may be carried out in bulk or solution. For the present invention it is preferred to have some solvent present to act as a cosolvent during dispersion. Suitable solvents for solution polymerization are ethylene glycol or propylene glycol and their derivatives, such as dipropylene glycol monomethyl ether and ethylene glycol monobutyl ether acetate; alcohols, such as butyl alcohol and diacetone alcohol; ketones, such as methyl propyl ketone and acetone; esters, such as butyl acetate and pentyl propionate; ethers, such as dioxane and tetrahydrofuran; and other compatible solvents, such as water and N-methyl pyrrolidone and mixtures thereof. One preferred mixture is ethylene glycol monobutyl ether and water.

Typical initiators are peroxides such as dialkylperoxides, peroxyesters, peroxydicarbonates, diacylperoxides, hydroperoxides, and peroxyketals and azo compounds such as 2,2'-azobis(2-methylbutanenitrile) and 1,1'-azobis (cyclohexanecarbonitrile).

Typical chain transfer agents are mercaptans such as octylmercaptan, n- or t-dodecylmercaptan; halogenated compounds; thiosalicylic acid, mercaptoacetic acid, mercaptoethanol, buten-1-ol, and dimeric alpha-methylstyrene. Mercaptans are preferred.

The reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be between one minute and thirty minutes.

The solvent or solvent mixture is generally heated to the reaction temperature and the monomers and initiator(s) are added at a controlled rate over a period of time, usually between 2 and 6 hours. A chain transfer agent or additional solvent may be fed in also at a controlled rate during this time. The temperature of the mixture is then maintained for a period of time to complete the reaction. Optionally, additional initiator may be added to ensure complete conversion.

The acid number of the polyacrylate is from about 5 to about 230 mg KOH/g, preferably from about 7 to about 156 mg KOH/g, most preferably from about 23 to about 117 mg KOH/g.

The polyacrylate has a weight average molecular weight of from about 4,000 to about 2,000,000, preferably from about 20,000 to about 400,000. The theoretical Tg of the polyacrylate is from about −30° C. to about 150° C., preferably from about 20° C. to about 75° C., and most preferably from about 30° C. to about 65° C.

The polyacrylate is partially or fully neutralized with ammonia and then diluted with deionized water under agitation to yield a finely divided dispersion. In another method, the polyacrylate is diluted in aqueous ammonia to yield a finely divided dispersion.

The aqueous anionic polyacrylate dispersion has a solid content from about 35% to about 65% by weight, preferably from about 40% to about 45% by weight.

Examples of commercially available polyacrylate dispersions are Synthemul 40-424 (Reichhold Chemicals Inc., Reaserch Triangle Park, N.C.), and Rhoplex WL-91 (Rohm & Haas Inc., Philadelphia, Pa.).

Polyurethane dispersions that are used in the invention are formed by reacting a polyester, polyether, polycarbonate, polylactone or polyacrylate containing terminal hydroxy functional groups with a diisocyanate such that the resulting intermediate product has terminal isocyanate groups. These isocyanate groups of the intermediate are then reacted with a compound that is reactive with the isocyanate groups and has at least one group that is capable of forming an anion. This group is subsequently neutralized with a tertiary amine to form a water dispersible polyurethane which is then dispersed in water and chain-extended with a diamine by the reaction of the diamine with unreacted isocyanate groups of the polyurethane. A process for making such polyurethanes in aqueous dispersion is disclosed in Drexler et al U.S. Pat. No. 4,489,135 issued Dec. 18, 1984 which is hereby incorporated by reference.

Examples of typical polyester polyols that can be used are formed by the reaction of a polyol with a dicarboxylic acid or an anhydride. Useful acids include succinic acid, adipic acid, maleic acid, azelaic acid, phthalic acid, isophthalic acid and anhydrides of these acids. Useful diols include ethylene glycol, butylene glycol, neopentyl glycol, hexane diol or mixtures of any of the above.

Suitable diisocyanates that may be used include toluene diisocyanate, tetramethylene diisocyanate, hexamethylene diisocyanate, isophorone diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,3-phenylene diisocyanate, 4,4-biphenylene diisocyanate, 1,5-naphthalene diisocyanate, bis-(4-isocyanatocyclohexyl)-methane, bis-(4-isocyanatocyclophenyl)-methane, 4,4-diisocyantodiphenylether, tetramethylxylene diisocyanate and the like.

Compounds that are reactive with the isocyanate groups and have a group capable of forming an anion may be chosen from dihydroxypropionic acid, dimethylolpropionic acid, dihydroxysuccinic acid and dihydroxybenzoic acid. Other suitable compounds include the polyhydroxy acids that can be prepared by oxidizing monosaccharides, for example, gluconic acid, saccharic acid, mucic acid, glucuronic acid and the like.

Suitable tertiary amines which can be used to neutralize the acid and form an anionic group to enable water dispersability are trimethylamine, triethylamine, dimethylamine, diethylamine, triphenylamine, dimethylethanolamine and the like.

Diamines that can be used for chain extension of the polyurethane to give N-alkyurea groups include ethylenediamine, diaminopropane, hexamethylene diamine, hydrazine and aminoethylethanolamine.

Typical polylactones that can be used to form the polyurethane can be lactones such as caprolactone reacted with a diol. Other useful lactones can be represented by the formula

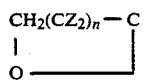

in which n is preferably 4 to 6 and Z is hydrogen, an alkyl radical, a cycloalkyl radical or an alkoxy radical and does not contain more than 12 carbon atoms. The most preferred lactone is $\epsilon$-caprolactone since it is readily available and provides a coating with excellent properties. Typical aliphatic diols that can be used to make the polylactone are ethylene glycol, 1,3-propanediol, 1,4-butanediol and dimethylolcyclohexane.

Useful polyethers that can be used to form the polyurethane are polypropylene glycols having an average molecular weight of about 400–4500. Typical polypropylene glycols that can be used are those designated as Niax 425, 2025, 3025, 4025 (available from Union Carbide) and the like. (The numbers designate the molecular weight of the polyproylene glycols).

Suitable hydroxyl terminated polyacrylates that can be used to form the polyurethane are prepared by ethylenic polymerization of acrylic esters such as the aforementioned alkyl acrylates or methacrylates with ethylenic unsaturated monomers containing functional groups such as carboxyl, hydroxyl, cyano groups and/or glycidyl groups. Any of the aforementioned alkyl acrylates or methacrylates can be used.

These polylactones, polyethers or polyacrylates are reacted as shown above for the polyester to form an aqueous polyurethane dispersion.

Examples of commercially available aqueous polyurethane dispersions are NeoRez R-960 (ICI Resins US, Wilmington, Mass.), and Spensol L-52 (Reichhold Chemicals Inc.).

Component (A) is used in the coating composition in an amount of about 20% to about 65%, preferably about 30% to about 40% by weight, based on the final aqueous coating composition.

The phosphorous containing pigment (B) could be an inorganic phosphate or phosphosilicate like zinc phosphate, calcium barium phosphosilicate, zinc molybdenum phosphate, calcium strontium phosphosilicate, zinc aluminum phosphate, calcium strontium zinc phosphosilicate, and the like. Preferably used are zinc phosphate, calcium strontium phosphosilicate, calcium strontium zinc phosphosilicate and zinc molybdenum phosphate.

The component (B) is used in an amount of from about 5% to about 15% by weight, preferably from about 8.5% to about 10% by weight, based on the final aqueous coating composition.

The additives (C) are selected from the group consisting of pigments, solvents, rust inhibitors, dispersants, surfactants or mixtures thereof.

The component (C) is used in the coating composition in an amount of about 20% to about 65%, preferably about 30% to about 40% by weight, based on the final aqueous coating composition.

All pigments known in the art, could be used in the coating composition of the present invention. Suitable pigments are for example talcum, china clay, titanium dioxide, carbon black, silica, magnesium silicate, barytes and the like. Preferred are talc, clay, titanium dioxide and carbon black. The pigments could be used in an amount of from about 5% to about 35% by weight of the final coating composition.

Suitable solvents for the coating composition of the present invention are aromatics like toluene, xylene or mixtures of aromatics like Solvesso 150 (Chemcentral Company), ether alcohols like butoxy ethanol, methoxy propanol, t-butoxy proponol, butoxy propanol, esters like alkylacetates of $C_1$ to $C_{20}$ alcohols, alcohols such as isopropanol and sec-butanol, and the like. Solvents could be used in an amount of from about 3% to about 9% by weight, preferably from about 5% to about 7% by weight, based on the final aqueous coating composition.

Other additives like defoamers, rust inhibitors, dispersants, surfactants, plasticizers, rheology modifiers, and others known in the art could be used in an effective amount.

To prepare the final aqueous coating composition, component (B) and (C) are mixed in the abovementioned relation into the aqueous anionic polyacrylate dispersion (A) under agitation. The final coating composition is adjusted to a pH of 8 to 9 with ammonia. Viscosity may be adjusted using deionized water.

The solid content of the final aqueous coating composition is from about 20% to about 65% by weight, preferably from about 40% to about 55% by weight.

The aqueous coating composition described hereinabove can be applied as a primer to a variety of substrates, such as cold rolled steel, phosphated steel, previously painted substrates and plastic substrates such as polyester reinforced fiberglass and reaction injection molded urethane, in one or more coats using for example an air atomizer (DeVilbiss Model JGA-502 spray gun, or Model JGHV-530 HVLP spray gun, available from DeVilbiss Company, Toledo, Ohio), or by using other conventional spraying means. The coating composition may also be applied electrostatically.

The primer is applied in a film thickness (dry film) of about 1.5 to 3, preferably 2.0 to 2.5 mils. The drying conditions are not critical and are between about 50° to 200° F. and 5% to 90% relative humidity for 30 to 90 minutes, dependant on conditions.

The VOC (volatile organic content as defined by ASTM D3960) of the primer is less than about 2.1 lbs/gal (less water), preferably less than about 1.9 lbs/gal (less water).

This primer can be topcoated with most refinish coatings known in the art, but especially with waterborne basecoats in order to eliminate the disappearance of the metallic effect. Any clearcoat known in the art may be applied on this basecoat.

TABLE I

Coating Composition
(all parts & percentages are on a weight basis unless otherwise indicated).

| Examples | 1 | 2 | 3 | 4 |
|---|---|---|---|---|
| Load in order to pebble mill | | | | |
| Deionized water | 17.217% | 13.802% | 12.254% | 16.331% |
| Bentone Gel (deionized water 85.474, Bentone EW 4.468, Isopropanol 10.062) | 7.901 | 3.62 | 5.551 | 1.970 |
| 28% Aqua Ammonia | .604 | .167 | .173 | .182 |
| "Synthemul" 40-425 (made by Reichhold Chemicals, acrylic resin) | 4.945 | 3.034 | 0 | 3.303 |
| "NeoRez" R-960 (made by ICI Resins, urethane dispersion resin) | 0 | 0 | 5.551 | 0 |
| Toluene | 2.131 | 0 | 0 | 0 |
| Butoxy Ethanol | 1.069 | 6.272 | 4.262 | 7.638 |
| Exxate 800 Solvent (made by Exxon Chemicals) | 0 | 0 | 1.425 | 0 |
| "Tamol" 850 (made by Rohm & Haas, sodium salt of polymeric carboxylic acid) | 0.65 | 0 | 0 | 0 |
| "Triton" X-100 (octyl phenoxy polyethoxyethanol 10 moles EO) | .037 | 0 | 0 | 0 |
| "Raybo" 60 No-Rust (made by Raybo Chemicals, alkylamine rust inhibitor) | 0 | .108 | .248 | 0.118 |
| Talc pigment | 8.153 | 17.668 | 17.916 | 19.231 |
| Aluminum silicate pigment | 4.869 | 0 | 0 | 0 |
| Titanium dioxide | 6.226 | 2.279 | 2.305 | 2.480 |
| Carbon black pigment | .130 | .051 | .05 | .055 |
| Silica pigment | .941 | 0 | 0 | 0 |
| Zind Phosphate pigment | 8.706 | 0 | 0 | 0 |
| Calcium strontium phosphosilicate pigment | 0 | 8.633 | 8.76 | 9.397 |
| Grind to 25-30 microns. Add to mill: | | | | |
| "Foamaster" R (made by Henkel, petroleum-based defoamer) | .187 | .2 | .223 | .218 |
| "Synthemul" 40-424 | 32.075 | 0 | 0 | 0 |
| "Rhoplex" WL-91 | 0 | 33.776 | 34.258 | 36.063 |
| Deionized water | 4.745 | 10.39 | 7.026 | 2.013 |
| Thickener blend (butoxy ethanol 70.00, "QR-708" -Rohm & Haas polyurethane thickener 30.00) | 0 | 0 | 0 | 1.001 |
| Total: | 100.001 | 100.000 | 100.002 | 100.000 |

Disperse 10 minutes. Drain mill.

PREPARATION OF THE COATING COMPOSITION

A. Millbase Preparation

A coating composition is prepared by first loading the liquid portion of the mill charge into a pebble mill. Then the pigments are loaded into the mill. The mill is then run for 36 hours, or until a pigment grind of 25-30 microns is obtained.

B. Primer Preparation

The remaining ingredients were then added to the pebble mill, and the grind portion and letdown portion are mixed in the mill for an additional 2 hours.

TABLE 2

Properties of the Coating Composition
The resulting primer composition(s) had the following physical properties:

| | |
|---|---|
| Viscosity - #4 Ford Cup (25° C.) | 40-50 seconds |
| pH | 9.0-9.5 |
| V.O.C. (Lbs/Gal) | 1.70-1.95 |
| Pigment/Binder Ratio | 1.80-2.00 |
| Weight/Gallon | 10.50-10.75 |
| Solids by Weight | 43.5%-49.0% |

The resulting primer was sprayed onto cold-rolled steel panels and dried at ambient conditions (70° F. and 50% relative humidity) for 60 minutes. The primer had a dry film thickness of 2.2-2.5 mils. The primer was then dry sanded with a dual action (DA) orbital sander using 400 grit paper to a thickness of 2.0-2.2 mils to obtain an ideal surface for the appearance of the topcoat. (The performance results were the same if the primer is left unsanded). The panels were then coated with a waterborne metallic basecoat composition followed by a two component, low VOC (<3.5 Lbs/Gal) acrylic urethane clearcoat, by spray application, and cured for 7 days at ambient conditions. The basecoat was applied at 0.4-0.9 mils dry film thickness and the clear coat had a dry film thickness of 1.9-2.3 mils.

TABLE 3

Properties of the Coating's Film
The cured panels had the following properties:

| | |
|---|---|
| Primer dry film build | 2.0-2.2 mils |
| Appearance, visual | Excellent |
| Gloss (20° angle) | 93+ |
| Distinctness of Image | 90+ |
| Adhesion (ASTM D3359) | 5B |
| Humidity Resistance (96 hours @ 38° C., 100% RH) | Blistering - none |
| Corrosion Resistance (240 hours salt spray, ASTM B-117) | Blistering - none<br>Adhesion - 5B<br>No loss of metallic effect<br>Creepage - <1 mm |

We claim:
1. An aqueous coating composition, comprising
   A) An aqueous anionic polyacrylate or polyurethane dispersion obtainable by dispersing
      1) a polyacrylate resin, having functional groups selected from the group consisting of carboxylic acid groups, carboxylic anhydride groups or mixtures thereof and which is obtainable by polymerizing i) about 1 to about 30% by weight of an ethylenically unsaturated carboxylic acid or anhydride or mixtures thereof;
ii) about 20 to about 90% other ethylenically unsaturated monomers;
iii) about 0 to 50% by weight of an ethylenically unsaturated monomer with a functional group other than carboxylic acid group or carboxylic anhydride group selected from the group consisting of hydroxyethyl (meth)acrylate, hydroxypropyl (meth)acrylate, isocyanatoethyl methacrylate, hydroxybutyl (meth)acrylate, propylene glycol monacrylate, 2,3-dihydroxyproply methacrylate, pentaerythritol monomethacrylate, polypropyleneglycol monoacrylate, m-isopropenyl-α,α-dimethylbenzyl isocyanate, maleic acid and fumaric acid dihydroxyalkyl esters N-hydroxyethylacrylamide, N-(2-hydroxypropyl)-methacrylamide, allylalcohol, monovinylether, 2,3-dihydroxypropylmonoallylether, trimethylolpropane monoallyether, 2,3-dihydroxypropanoic acid allylester and mixtures thereof;

and dispersing the resulting polyacrylate resin in water in the presence of ammonia, or;

2) a fully reacted polyurethane resin, having a carboxylic acid group, formed from the reaction of a compound selected from the group consisting of a glycol, a polyol of polyester, a polyol of polyether, a polyol having a carboxylic acid group and mixtures thereof with a diisocyanate, and then neutralized with ammonia or other amine, and dispersed in water;

B) a phosphorous containing pigment, selected from the group consisting of zinc phosphate, calcium barium phosphosilicate, zinc molybdenum phosphate, calcium strontium phosphosilicate, zinc aluminum phosphate, calcium strontium zinc phosphosilicate, and mixtures thereof;

C) additives selected from the group consisting of pigments, solvents, rust inhibitors, dispersants, surfactants or mixtures thereof.

2. The coating composition according to claim 1, wherein the ethylenically unsaturated carboxylic acid is selected from the group consisting of acrylic acid, methacrylic acid, acryloxypropionic acid, polyacrylic acid mixtures, methacrylic acid dimer, polymethacrylic acid mixtures, crotonic acid, fumaric acid, maleic acid, monoalkylesters of maleic, fumaric, itaconic acids or mixtures thereof.

3. The coating composition according to claim 1, wherein the ethylenically unsaturated carboxylic anhydride is selected from the group consisting of maleic anhydride, itaconic anhydride or mixtures thereof.

4. The coating composition according to claim 1, wherein the polyacrylate resin has an acid number of 0 to 230 mg KOH/g.

5. The coating composition according to claim 1, wherein the polyacrylate resin has a weight average molecular weight of from 4,000 to about 4,000,000.

6. The coating composition according to claim 1, wherein the polyacrylate resin has a theoretical $T_g$ of from $-30°$ C. to about $150°$ C.

7. The coating composition according to claim 1, wherein the phosphorous containing pigment is selected from the group consisting of zinc phosphate, calcium barium phosphosilicate, zinc molybdenum phosphate, calcium strontium phosphosilicate, calcium strontium zinc phosphosilicate, or mixtures thereof.

8. The coating composition according to claim 1, wherein the solvents are selected from the group consisting of toluene, xylene, mixtures of aromatics, butoxy ethanol, methoxy propanol, t-butoxy propanol, aceticesters of $C_1$ to $C_{20}$ alcohols, alcohols or mixtures thereof.

9. The coating composition according to claim 1, wherein the pigments are selected from the group consisting of talcum, titanium dioxide, carbon black, silica, clays, magnesium silicate, barytes, or mixtures thereof.

10. The coating composition according to claim 1, comprising from about 20% to about 65% by weight of component (A) from about 5% to about 15% by weight of component (B) and from about 20% to about 65% by weight of component (C).

11. The coating composition according to claim 1, wherein the total solid content is from about 20% to about 65% by weight of the complete aqueous coating composition.

12. A method of coating a substrate with a coating composition according to claim 1.

13. A method of coating a substrate with multiple layers of a coating comprising applying the coating composition according to claim 1 as a primer coat on the substrate prior to applying at least one further coat on said primer coat.

14. A substrate coated with at least one coating composition according to claim 1.

* * * * *